(12) United States Patent
Hess et al.

(10) Patent No.: US 6,575,496 B2
(45) Date of Patent: Jun. 10, 2003

(54) SYSTEM AND METHOD AND METHOD FOR SEAM PROFILE MINIMIZATION FOR AN INFLATABLE CURTAIN

(75) Inventors: Travis B. Hess, Farr West, UT (US); Kurt E. Kottke, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/864,963

(22) Filed: May 24, 2001

(65) Prior Publication Data

US 2002/0175503 A1 Nov. 28, 2002

(51) Int. Cl.$^7$ ............................................. B60R 21/00
(52) U.S. Cl. .................................. 280/730.2; 280/743.1
(58) Field of Search ......................... 280/730.1, 730.2, 280/743.1

(56) References Cited

U.S. PATENT DOCUMENTS

| | | | |
|---|---|---|---|
| 5,470,101 A | | 11/1995 | Ennis |
| 5,884,937 A | * | 3/1999 | Yamada .................... 280/730.2 |
| 6,155,596 A | * | 12/2000 | Nakajima et al. ......... 280/730.2 |
| 6,176,514 B1 | * | 1/2001 | Einsiedel .................. 280/730.2 |
| 6,220,629 B1 | * | 4/2001 | Wipasuramonton et al. ..... 280/743.1 |
| 6,244,619 B1 | * | 6/2001 | Satzger .................... 280/730.2 |
| 6,299,965 B1 | * | 10/2001 | Keshavaraj ................. 428/125 |
| 6,328,334 B1 | * | 12/2001 | Kanuma .................... 280/730.2 |

FOREIGN PATENT DOCUMENTS

| | | |
|---|---|---|
| DE | 19743626 A1 | 4/1998 |
| EP | 0847904 A1 | 6/1998 |

* cited by examiner

*Primary Examiner*—Paul N. Dickson
*Assistant Examiner*—Laura B. Rosenberg
(74) *Attorney, Agent, or Firm*—Sally J. Brown; James D. Erickson (57) ABSTRACT

A system and method for reducing the profile of compacted seams in an inflatable curtain modules is disclosed. A cushion of an inflatable curtain module has interior seams configured to separate the cushion into chambers. The interior seams are angled with respect to the direction along which the cushion is compacted to ensure that each interior seam does not simply bunch up at a one single location along the length of the compacted cushion. Preferably, the interior seams are angled so that overlap does not occur along at least half the length of each interior seam. The angle may be further selected to ensure that no overlap occurs, or even that no two portions of any interior seams can interfere to create a combined bulge. The interior seams may be modestly angled, aggressively angled to form a nested configuration, or even angled perpendicular to the compaction direction. The interior seams may also be curved to produce a more even displacement between helical turns of the interior seams after the cushion has been rolled.

33 Claims, 8 Drawing Sheets

SYSTEM AND METHOD AND METHOD FOR SEAM PROFILE MINIMIZATION FOR AN INFLATABLE CURTAIN

BACKGROUND OF THE INVENTION

1. The Field of the Invention

The present invention relates to systems and methods for protecting vehicle occupants from impact. More specifically, the invention relates to a system and method for more tightly compacting an inflatable curtain module for installation in a comparatively narrow space.

2. Technical Background

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal acceleration or deceleration and triggers the ignition of an explosive charge. Expanding gases from the charge fill the airbags, which immediately inflate in front of the driver and passenger to protect them from impact against the windshield. Side impact airbags have also been developed in response to the need for similar protection from impacts in a lateral direction, or against the side of the vehicle.

Typically, side impact airbags have a cushion that is mounted on or near the roof rail, or the portion of the frame that extends along the length of the vehicle between the side windows and the roof. The cushion is typically compacted, i.e., folded, rolled, or processed through a combination of folding and rolling, to stow the cushion behind a headliner covering the interior of the roof of the vehicle. The cushion may be designed to unfold or unroll downward to inflate beside a passenger to keep the passenger from hitting the door or window during lateral impact.

However, despite their enormous lifesaving potential, airbags, and particularly side impact airbags, have typically been limited to certain vehicles and configurations. In part, these limitations result from the fact that even after a mechanized compaction process, the cushion is often still quite bulky. Some more compact vehicles simply do not have the space to accommodate the bulk of currently available side impact airbags. Seatbelts are somewhat effective in restraining forward motion of an occupant, as in a head-on collision, but they leave a person more or less unprotected from sideways motion. As a result, people in compact vehicles are now unable to obtain any significant protection from lateral impact and rollovers.

Unfortunately, even in vehicles large enough to hold side impact airbags, it is difficult to properly mount and hide the airbags in the vehicle. Airbags mounted in a visible, accessible location are to be avoided because they are unsightly and may be tampered with by children and others. However, the space between the roof and the headliner is necessarily limited to minimize the profile of the vehicle.

The problem of finding adequate space to mount the compacted airbag is further exacerbated by the fact that traditional side impact cushions do not fold evenly. Typically, known cushions have a protection zone divided into chambers to control the size and shape of the cushion in inflated form. Often, the chambers are made vertical so that the cushion shortens horizontally during inflation, thereby tightening the cushion to provide more resilient side impact protection, particularly when the inflated cushion is not supported by a window.

Vertical seams normally separate the chambers from each other. The seams can be formed in a wide variety of ways, including weaving, adhesive or chemical bonding, thermal processing, and the like. Unfortunately, some seam formation methods tend to create a seam that is somewhat thicker than the surrounding material. Thus, when the cushion is folded or rolled for mounting on the roof rail, each seam stacks against itself to create a bulge in the compacted cushion. Such bulges increase the profile of the compacted cushion, thereby making it difficult or impossible to mount the cushion in the comparatively small space surrounding the roof rail.

Consequently, it would be an advancement in the art to provide a system and method for minimizing the profile of seams in compacted inflatable curtain modules. Preferably, such a system and method should be usable with current folding methods and machinery, and with current cushion manufacturing systems. Thus, the system and method should preferably consist of only a minimal change in the design of the cushion.

BRIEF SUMMARY OF THE INVENTION

The apparatus of the present invention has been developed in response to the present state of the art, and in particular, in response to the problems and needs in the art that have not yet been fully solved by currently available inflatable curtain modules. Thus, the present invention provides a cushion for an inflatable curtain module in which the seams are angled and displaced from each other so that seam overlap is minimized. The bulk of the seams can thus be spread relatively evenly along the length of the compacted curtain.

In one embodiment of a cushion for an inflatable curtain module, the cushion has a top edge configured to be attached to a roof rail, a bottom edge, and a protection zone between the top and bottom edges in which inflatable chambers are separated by interior seams. The bottom edge can be compacted, i.e., folded or rolled, toward the top edge in a compaction direction to convert the cushion into a comparatively long, thin structure.

The interior seams are positioned at an angle with respect to the compaction direction; the angle is selected such that the seam will not overlap itself along at least half its length. "Overlap" is the disposition of the interior seam such that the bulge created by the seam on one layer interferes with the bulge created by the interior seam, or by a different interior seam, in an adjacent layer.

Such an angle can be determined with reference to the length and width of each interior seam and the number of compaction cycles that will be applied to the cushion. A compaction cycle is, in the case of rolling, one roll (360°), or in the case of folding, two overlapping, 180° folds.

In selected embodiments, the cushion is rolled, such that the angled interior seam forms a helical shape with a variable diameter when the cushion is compacted. Each helical shape has a plurality of turns. With a rolled cushion, if the angle is one-half the inverse sine of the quantity consisting of the number of compaction cycles multiplied by two and by a thickness of the interior seam and divided by the length of the interior seam, there will be overlap along approximately half the length of the interior seam. The angle is thus preferably somewhat larger, so that overlap occurs along less than half the length of the interior seam.

In certain embodiments, the angle is large enough that no overlap occurs along the entire length of the seam. Yet further, in certain embodiments, the angle is large enough that no portion of the seam faces any other portion directly through the entire thickness of the compacted cushion. In such an embodiment, there is no interference between interior seam portions in adjacent layers, and there is furthermore no interference between interior seam portions in nonadjacent layers.

If the cushion is folded, a somewhat similar method may be used to optimize the interior seam angles to reduce or avoid overlap. However, instead of the helical configuration, the angle of the interior seam may produce a somewhat zigzagged configuration, with zigzags that are either the same width or different widths, depending on the folding method used.

According to an alternative embodiment, multiple interior seams are provided, in which the angle of each interior seam is large enough that the helical shapes formed by the interior seams during rolling are nested, or interleaved. In such a configuration, the interior seams are preferably displaced from each other such that no overlap between one seam and the next occurs. A similar nested pattern may be obtained in a folded cushion.

According to another alternative embodiment, the interior seams may be arrayed perpendicular to the compaction direction. Thus, each interior seam is parallel to the length of the compacted cushion, and no overlap of any interior seam with itself will occur. However, the interior seams should then be carefully positioned with respect to each other to ensure that adjacent seams do not overlap.

If rolling is the selected compaction method, adjacent seams should thus be disposed at different angular positions with respect to the center of the compacted cushion. Indeed, if desired, the interior seams may be relatively positioned such that the angular thicknesses of the interior seams have no overlap with each other.

If folding is the selected compaction method, the interior seams may be similarly separated by a distance calculated to avoid overlap. In such a case, linear thickness, rather than angular thickness, may apply. The interior seams may simply be disposed such that the linear thickness of each seam does not overlap with that of its neighbor, or with that of any other interior seam, if desired.

In yet another embodiment, the seams need not be straight, but may be curved to more fully prevent overlap. If rolling is the selected compaction method, overlap is more likely among the tighter turns of the helix of the interior seam, i.e., toward the bottom edge of the cushion. Thus, the interior seam or seams may have a comparatively small slope proximate the bottom edge, and a comparatively large slope (a smaller angle with respect to the compaction direction) proximate the top edge. Thus, all of the turns of the helical configuration may be separated by an equal displacement.

These configurations serve to spread the bulk of the interior seams out relatively evenly along the length of the compacted cushion. Thus, the inflated shape and tension of the cushion can still be determined through the formation of chambers of the protection zone, without creating bulges in the compacted cushion from the interior seams. The design, manufacture, and compaction of the cushions is otherwise similar to methods utilized in the past; thus, the system and method of the present invention may be employed with little or no additional engineering and tooling costs for the cushion manufacturer.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained and be readily understood, a more particular description of the invention briefly described above will be rendered by reference to specific embodiments thereof which are illustrated in the appended drawings. Understanding that these drawings depict only typical embodiments of the invention, and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

Generally, separate chambers in an inflatable curtain serve a number of purposes. The chambers serve to determine the shape of the inflated cushion. In a side-by-side configuration, the chambers require the cushion to take on an elongated configuration instead of the more spherical shape that would typically be formed by a pressurized fabric enclosure without internal seams.

Additionally, the inflation of the chambers causes the cushion to shorten in the direction perpendicular to the chambers. Thus, if the chambers are vertical, the cushion shortens horizontally as it inflates. Such shortening can be desirable to produce tension to hold the cushion in place. For example, the cushion may be tethered to the A pillar, the B pillar, or some other part of the vehicle alongside the cushion. The tension produced by the inflation of the cushion acts in concert with the tethering to ensure that the cushion will not be pushed, for example, out of an open car window when the user strikes the cushion.

The present invention utilizes principles of geometry and fabric deformation to effectively reduce the profile of the inflatable curtain, while still permitting the chambers to be configured to provide optimal protection for vehicle occupants. More specifically, the interior seams are angled from the compaction direction to ensure that the interior seams stack as little as possible during compaction. Preferably, the bulk of each interior seam is somewhat evenly distributed along a portion of the length of the compacted cushion. The manner in which the interior seams are configured and distributed will be more fully described in connection with the following descriptions and their accompanying figures.

Figure 1:
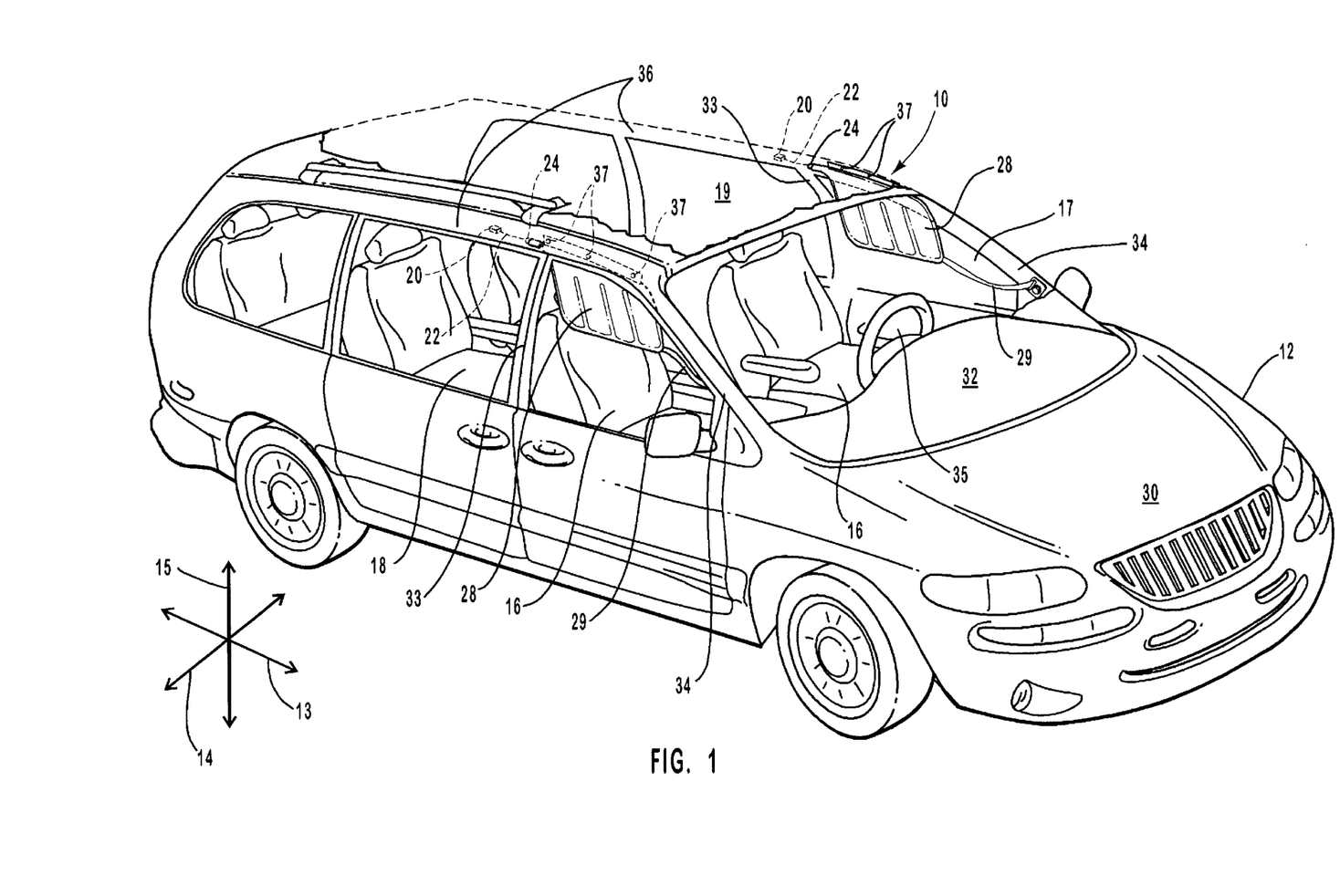
FIG. 1 is a perspective view of a vehicle incorporating one embodiment of an inflatable curtain module with enhanced seam profile reduction according to the invention.

Referring to FIG. 1, an inflatable curtain module 10 is depicted in an inflated configuration within a vehicle 12. The inflatable curtain module 10, and the vehicle 12 in general, may have a longitudinal direction 13, a lateral direction 14, and a transverse direction 15. The vehicle 12 further has front seats 16 laterally displaced from a first lateral surface 17, or front door 17, as shown in the vehicle 12 of FIG. 1. The vehicle 12 also has rear seats 18 laterally displaced from a second lateral surface 19, or rear door 19, as depicted.

One or more accelerometers 20 or other similar impact sensing devices detect sudden lateral acceleration (or deceleration) of the vehicle 12 and transmit electric signals via electric lines 22 to sources 24 of pressurized gas, or inflators 24. Each of the inflators 24 may take the form of a hollow pressure vessel containing a chemically reactive material that initiates a rapid pressure surge in the inflator 24 upon application of electricity. The expanding gases inflate cushions 28 situated between occupants of the front seats 16 and the front doors 17. The entire process occurs with such rapidity that, before the vehicle 12 has fully reacted to the impact, the cushions 28 have inflated to protect vehicle passengers.

Tethers 29 may be attached to the cushions 28 to keep the cushions 28 positioned against the front doors 17 so that they do not injure users when they inflate or move to a less protective position. Each of the tethers 29 may be substantially constructed of a sturdy fabric material. The accelerometers 20 and inflators 24 may be stowed within an engine compartment 30 or dashboard 32, or may be arrayed closer to the cushions 28, as depicted in FIG. 1. The inflators 24 may even be positioned partially within the cushions 28, as shown, so that gases exiting the inflators 24 travel directly into the cushions 28. In the alternative, a gas guide (not shown) may be used to convey gases from the inflators 24 to the cushions 28.

The inflated cushions 28 may or may not extend far enough to cover B pillars 33 of the vehicle 12, which extend generally vertically between the front and rear doors 17, 19. Each of the tethers 29 may be anchored to one of the A pillars 34, which are positioned between the front doors 17 and the windshield 35. As depicted in FIG. 1, each of the cushions 28 is installed along a roof rail 36 over the front door 17. In most vehicles, the A pillars 34, B pillars 33, and roof rails 36 are extensions of the vehicle frame designed to provide protection in the event of a vehicle rollover. Thus, they may be configured as hollow members constructed of a sturdy material such as steel.

Figure 2:
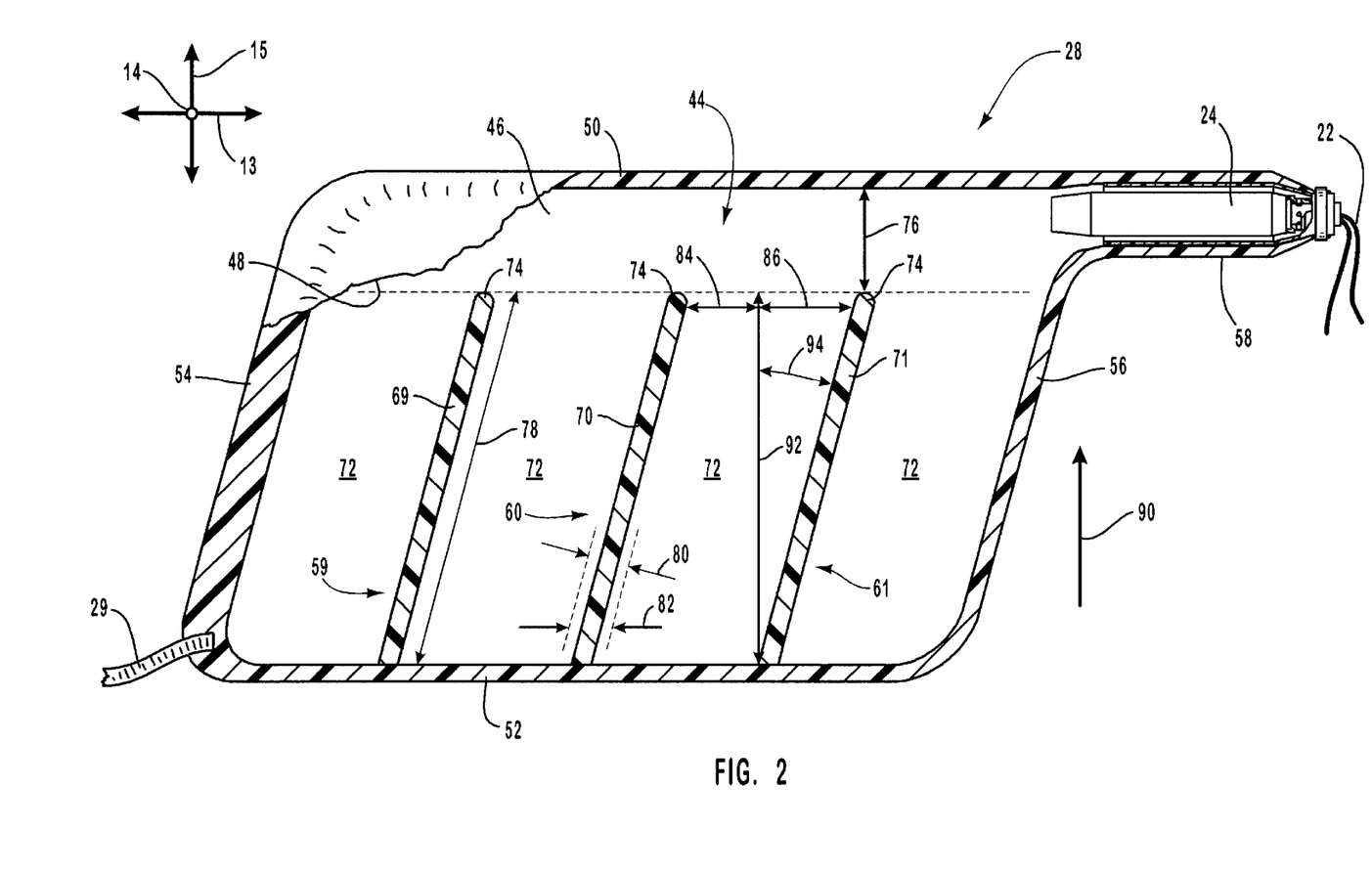
FIG. 2 is a side elevation, section view of a cushion of the inflatable curtain module of FIG. 1, with interior seams disposed at an angle determined by the method of the present invention.

Referring to FIG. 2, a section view of the cushion 28 of FIG. 1 is depicted, in an uninflated, uncompacted state. The terms "vertical" and "horizontal" will be used with reference to a cushion 28 attached to hang from the roof rail 36 of the vehicle 12, although the cushion 28 will probably be manufactured in a different orientation.

The cushion 28 has a protection zone 44 designed to receive and absorb the impact of a vehicle occupant's head and/or shoulder. The protection zone 44 has a first membrane 46 and a second membrane 48, between which the pressurized gases from the inflator 24 are captured for the duration of the impact. The membranes 46, 48 are preferably constructed of a sturdy woven fabric or the like.

The first and second membranes 46, 48 may be attached together above the protection zone 44 to form a top edge 50. The top edge 50 may have holes, fasteners, or other devices (not shown) that can be used to attach the cushion 28 to the roof rail 36. The first and second membranes 46, 48 may be attached by weaving with their own internal fibers with a technology such as one-piece woven, or OPW technology. In the alternative, the first and second membranes 46, 48 may be attached through RF welding, chemical, adhesive, or thermal bonding, clamping, or the like.

Preferably, the first and second membranes 46, 48 are attached in similar fashion below the protection zone 44 to form a bottom edge 52. The top and bottom edges 50, 52 are preferably parallel as shown, but may also be angled with respect to each other. Similarly, the first and second membranes 46, 48 may be attached forward of the protection zone 44 to form a forward edge 54, and rearward of the protection zone 44 to form a rearward edge 56. The forward and rearward edges 54, 56 may be forwardly and rearwardly oriented, respectively, with respect to the vehicle 12. In the depicted embodiment, the rearward edge 56 is opened toward the to edge 50 to form a supply port 58, in which the inflator 24 is installed.

The protection zone 44 may have a first interior seam 59, a second interior seam 60, and a third interior seam 61. The interior seams 59, 60, 61 may be formed using OPW methods, RF welding, chemical, adhesive, or thermal bonding, clamping, or the like. Methods such as RF welding may be advantageous in that a seam can be rapidly and easily formed.

In order to RF weld two layers together, a strip of RF weldable material, such as a urethane based fabric or plastic, may first be positioned between the two layers. The layers may be either formed of or coated with a similar RF weldable material. Radio frequency electromagnetic energy may then be applied against the layers and the strip to bond them together, thereby forming a seam. The strip helps to ensure that the weld is formed only along the region defined by the strip.

Thus, RF welding is easy and comparatively accurate. However, due to the addition of the RF weldable strip, an RF welded seam is often somewhat thicker than the surrounding material. In the case of the cushion 28, the first, second, and third interior seams 59, 60, 61 may have a first strip 69, a second strip 70, and a third strip 71, respectively, for use in RF welding or other attachment procedures. The interior seams 59, 60, 61 separate the cushion 28 into a plurality of chambers 72.

Each of the interior seams 59, 60, 61 may have a distal end 74 closest to the top edge 50 of the cushion. Preferably, the distal ends 74 are displaced somewhat from the top edge 50 to leave a gap 76, through which gases can flow into the chambers 72 from the inflator 24. Each of the interior seams 59, 60, 61 may have a length 78, an actual width 80, and an effective width 82.

The actual width 80 is the width of the thicker portion of the protection zone 44 created by each of the interior seams 59, 60, 61. Since the membranes 46, 48 must fit around the strips 69, 70, 71, the actual width 80 includes the width added by the membranes 46, 48 as well as the width of the strips 69, 70, 71. The effective width 82 is the width of each of the interior seams 59, 60, 61 perpendicular to the direction in which the cushion 28 will be compacted. Thus, in the embodiment of FIG. 2, the effective width 82 is the horizontal width of each of the interior seams 59, 60, 61. Like the actual width 80, the effective width 82 also includes the width of the membranes 46, 48 around the strips 69, 70, 71.

Each of the interior seams 59, 60, 61 may be separated from its neighbor by an offset 84. The offset 84 is defined by the distance between the nearest parts of the interior seams 59, 60, 61 perpendicular to the direction in which the cushion 28 will be compacted. Since each of the interior seams 59, 60, 61 is straight and disposed at angle, the offset 84 is the horizontal distance between the top of one of the interior seams 59, 60 and the bottom of the next, directly rearward interior seam 60, 61. Each of the interior seams 59, 60, 61 may have a longitudinal displacement 86 defined as the travel of the interior seam 59, 60, 61 perpendicular to the direction in which the cushion 28 will be compacted.

The compaction direction is shown as an arrow 90. In this embodiment, compaction is performed by moving the bottom edge 52 directly toward the top edge 50; thus, the compaction direction 90 is vertical, or perpendicular to the top and bottom edges 50, 52. In other embodiments, the cushion 28 need not be folded perpendicular to the top edge 52, but may be folded at some other angle. For example, if the cushion 28 were mounted to the B pillar 33 and configured to inflate forward to cover the first lateral surface 17, the cushion 28 may be folded toward the rearward edge 56.

"Compaction," as used herein, refers to any method by which a flexible cushion may be reconfigured for compact storage. Thus, compaction includes folding, rolling, and any combination of folding and rolling. Folding includes the use of successive folds in alternating directions as well as the use of successive inward folds.

Creation of successive folds in alternating directions results in an accordion-style compacted configuration, in which folds are aligned at either end of the compacted form. Creation of successive inward folds provides a compacted structure somewhat similar to rolling, in that the material is layered continually outward. However, the material is not continuously curved; rather, the folds may be separated by comparatively flat sections of material, so that the compacted shape is not circular, but elliptical or otherwise oblong in cross section.

A "compaction cycle" is simply one complete circuit of motion of the cushion material. For example, in the case of rolling, a compaction cycle is one complete roll (360°). In the case of folding, a compaction cycle consists of two overlapping, 180° folds. Thus, if the cushion 28 is rolled four times, there are four compaction cycles. If the cushion 28 is folded back and fourth three times, there are three compaction cycles.

Each of the interior seams 59, 60, 61 may also have a transverse displacement 92, defined as the travel of each of the interior seams 59, 60, 61 in a direction parallel to the compaction direction 90. Thus, in the configuration of FIG. 2, the transverse displacement 92 is the vertical height of each of the interior seams 59, 60, 61. Therefore, the transverse displacement 92 added to the gap 76 equals the vertical (transverse) height of the protection zone 44.

Each of the interior seams 59, 60, 61 is disposed at an angle 94 with respect to the compaction direction 90. Through the use of trigonometry, the angle 94 may be defined in terms of the length 78, the longitudinal displacement 86, and/or the transverse displacement 92. Preferably, the angle 94 is selected such that the longitudinal displacement 86 is sufficient to prevent overlap of each of the interior seams 59, 60, 61 with itself along at least half the length 78. More preferably, the angle 94 is selected such that each of the interior seams 59, 60, 61 has no overlap with itself.

The strips 69, 70, 71 make the interior seams 59, 60, 61 somewhat thicker than the uninflated chambers 72. Consequently, if the interior seams 59, 60, 61 were parallel to the compaction direction 90, compaction of the cushion 28 would cause each of the interior seams 59, 60, 61 to stack against itself, thereby creating bulges in the compacted cushion 28.

"Overlap," as used herein, refers to portions of the interior seams 59, 60, 61 (either portions of one interior seam 59, 60, 61, or portions of two separate interior seams 59, 60, 61) that are in contact with each other such that the thickness of each portion is combined to create a bulge. Thus, only seam portions on adjacent layers of the compacted cushion can overlap within the definition used herein. However, it may be beneficial to design the interior seams 59, 60, 61 such that no two portions of any interior seam or seams 59, 60, 61 are aligned to face each other in the compacted cushion 28. These concepts will be discussed in greater detail subsequently.

Generally, if each compaction cycle includes approximately the same amount of material, overlap may be substantially prevented by ensuring that the interior seams 59, 60, 61 are displaced in the longitudinal direction 13 by a distance greater than the effective width 82 of the seam 59, 60, 61 for each compaction cycle. Thus, if four compaction cycles are to be used, the longitudinal displacement 86 should be four times the effective width 82 of the seams 59, 60, 61. With the application of trigonometry, those of skill in the art will recognize that the angle 94 must then be equal to one-half the inverse sine of the quantity consisting of the number of compaction cycles multiplied by two and by the actual thickness of the interior seam and divided by the length of the interior seam.

However, if rolling is the chosen compaction method, each compaction cycle will not include the same amount of material because the interior rolls will be smaller than the exterior rolls. Thus, the formula outlined above will operate to prevent overlap in the outer layers, in which the interior seam moves further in the longitudinal direction 13, due to the increased circumference of the roll. However, unless a larger angle 94 is used, each of the seams 59, 60, 61 will overlap somewhat with itself in the interior rolls.

Thus, it may be said that an angle 94 equal to one-half the inverse sine of the quantity consisting of the number of compaction cycles multiplied by two and by the actual thickness of the interior seam and divided by the length of the interior seam is sufficient to avoid overlap along at least half the length of each interior seam 59, 60, 61. If comparatively thin interior seams 59, 60, 61 are used, the angle 94 may, for example range from about 5° to about 10°. However, if the interior seams 59, 60 are comparatively thick, the angle 94 may range from about 10° to about 40°.

Avoiding overlap only in the outer layers of a rolled cushion may be sufficient to reduce the profile of the folded cushion. The cushion 28 is composed of a flexible material such as fabric; thus, the outer layers are able to flex around bulges in the interior rolls, and thereby minimize the extent to which the bulges exist in the folded cushion. However, it may be preferable to increase the angle 94 to a level great enough to avoid overlap along the whole length of each of the interior seams 59, 60, 61.

If folding, or more specifically, the use of successive folds in alternating directions, is the selected compaction method, the formula described above may be sufficient to avoid overlap along a greater portion of the seam because the folds are aligned and each compaction cycle includes substantially the same amount of material. However, a portion of each of the interior seams 59, 60, 61 will overlap in the vicinity of each fold, regardless of how large the angle 94 is. This is because each seam 59, 60, 61 is folded against itself, so some overlap is unavoidable.

Folding with successive inward folds may have overlap characteristics similar to both rolling and folding with successive alternating folds. Thus, some overlap may be unavoidable due to the folds, and the compaction cycles (i.e., each complete set of two folds) will be progressively smaller toward the center of the compacted cushion.

Regardless of the compaction method used, if the angle 94 were zero degrees, i.e., if the interior seams 59, 60, 61 were made parallel to the compaction direction 90, each of the interior seams 59, 60, 61 would overlap with itself along all or nearly all of its length. Thus, the use of a nonzero angle 94 helps to reduce overlap, and thereby minimize the profile of the folded cushion 28, regardless of the compaction method used.

Furthermore, if the angle 94 is equal to or greater than one-half the inverse sine of the quantity consisting of the number of compaction cycles multiplied by two and by the actual thickness of the interior seam and divided by the length of the interior seam, self-overlap of each interior seam 59, 60, 61 will almost certainly be avoided along at least half the length of the interior seams 59, 60, 61. Thus, although the remaining examples are of rolled cushions, the inventive principles embodied in the examples relate to folded cushions as well.

The cushion 28 depicted in FIG. 2 has three interior seams 59, 60, 61. Those of skill in the art will recognize that any number of interior seams may be used, as adapted to the operation of the cushion. For example, if the cushion 28 needs to be flatter in the inflated state, or is required shorten more in the longitudinal direction 13 to create a higher amount of tension, more interior seams 59, 60, 61 may be used. Similarly, less interior seams 59, 60, 61, including only a single interior seam, may be utilized if flatness and tension in the cushion 28 are not as important.

Figure 3:
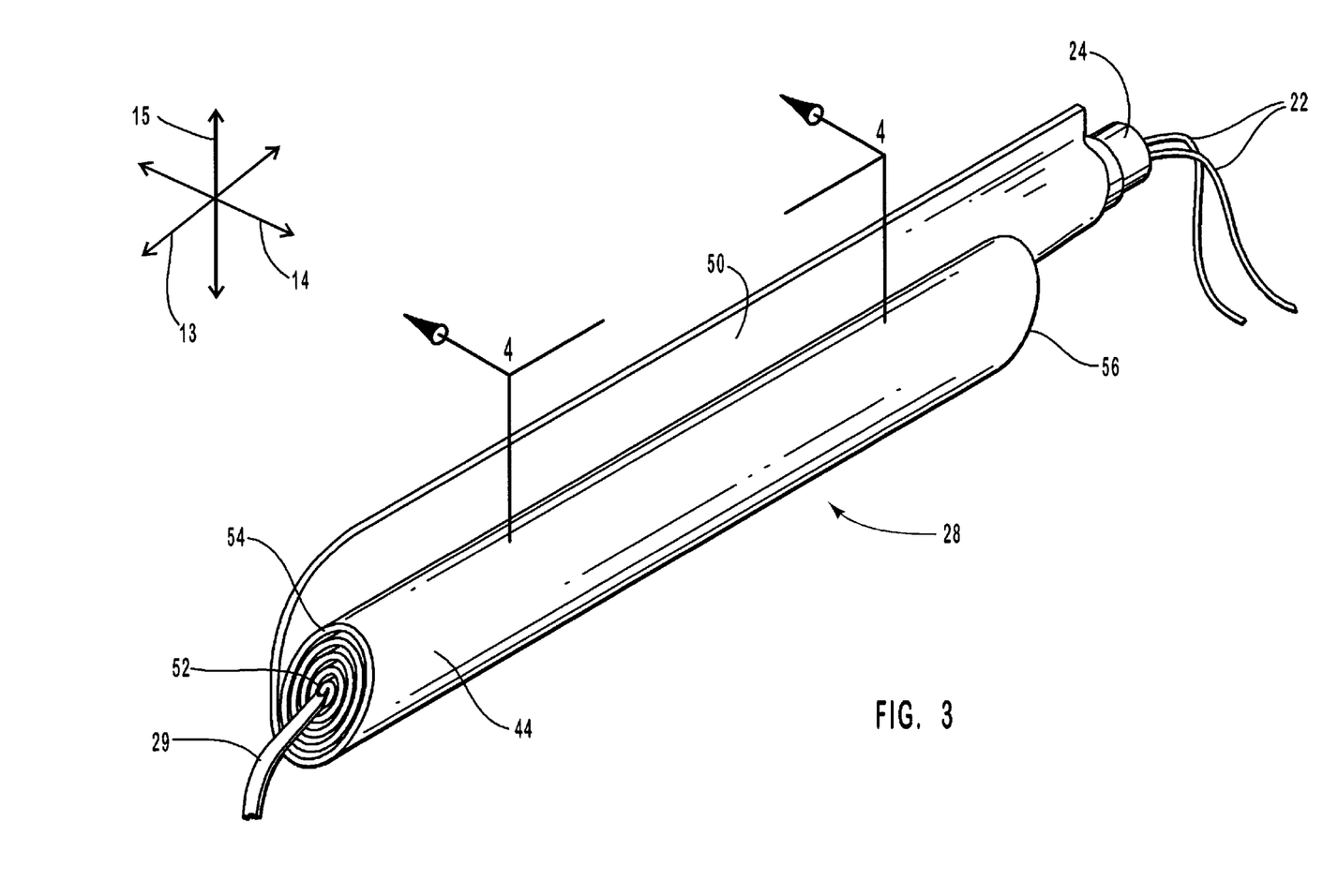
FIG. 3 is a perspective view of the cushion of FIG. 2, in a compacted, or rolled, configuration.

Referring to FIG. 3, a perspective view of the cushion 28 in a compacted state is shown. As depicted, the cushion 28 has been rolled such that the bottom edge 52 is disposed in the middle of the compacted cushion 28. The tether 29 extends outward from the rolled cushion 28 so that the tether 29 can be attached to a suitable location, such as the A pillar 34. The entire rolled cushion 28 may be positioned against the roof rail 36 and attached, for example, through the use of fasteners (not shown) applied between the top edge 50 and the roof rail 36.

Preferably, the rolling operation is carried out by a machine so that the rolls are tight and comparatively uniform. The folded cushion 28 may be bent or contoured as needed to suit the shape of the roof rail 36.

Figure 4:
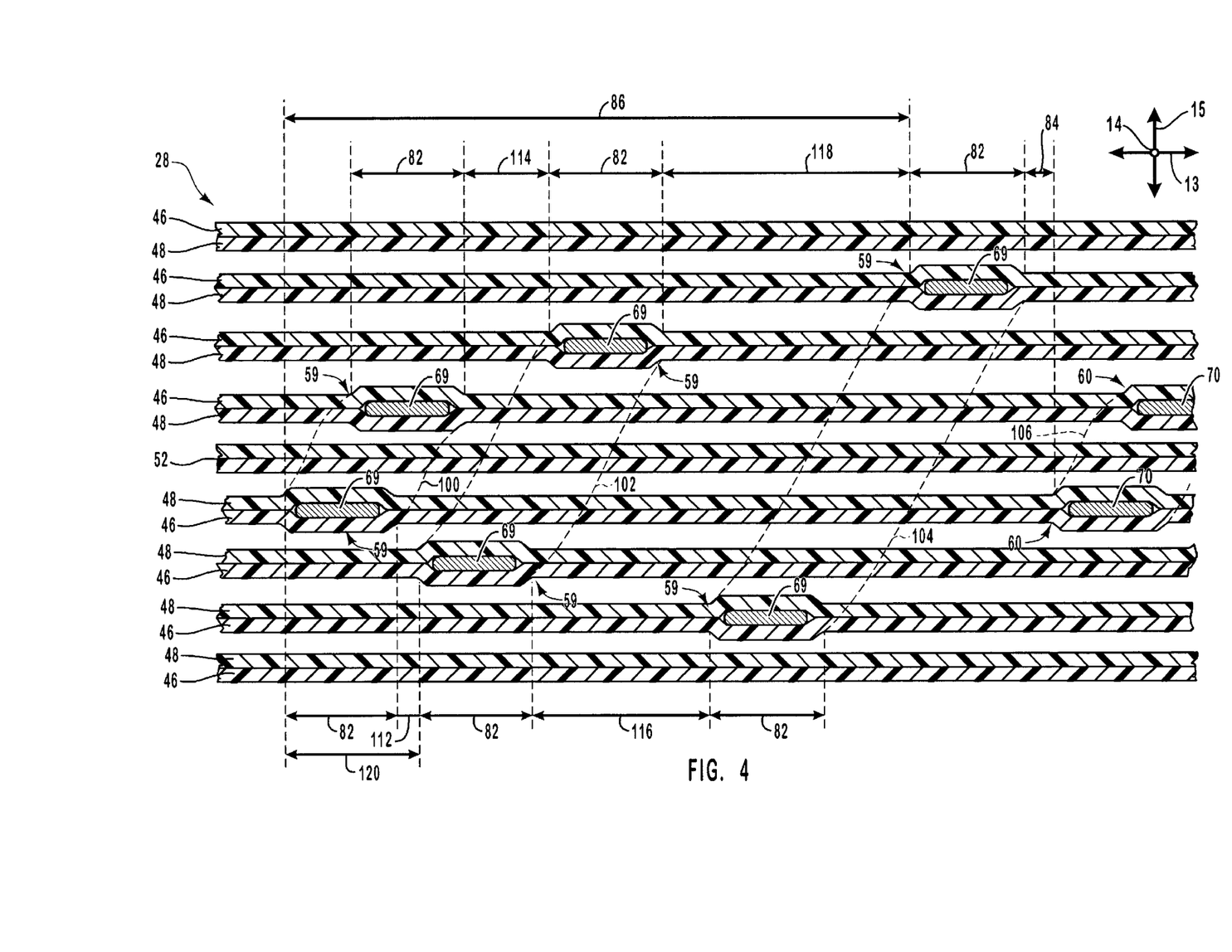
FIG. 4 is a side elevation, section view of the rolled cushion of FIG. 3, depicting the first interior seam and a portion of the second interior seam in a helical configuration with no overlap.

Referring to FIG. 4, a section view through the center of a portion of the rolled cushion 28 is shown. More specifically, the depicted portion of the cushion 28 includes the first interior seam 59 and a portion of the second interior seam 60. As previously described, the first seam 59 includes a strip 69 sandwiched between the first and second membranes 46, 48, and attached to the membranes 46, 48 through a method such as RF welding, adhesive bonding, or the like. As shown, three compaction cycles, or complete, 360° rolls, have been used to roll the cushion 28.

When the cushion 28 is rolled, the angle 94 of the first interior seam 59 causes the first interior seam 59 to take a helical configuration, with a diameter that varies with each successive roll of the cushion 28. More specifically, when the bottom edge 52 is initially rolled against the protection zone 44 to complete the first compaction cycle of the rolling process, the portion of the first interior seam 59 closest to the bottom edge 52 is rolled to form a first turn 100. As shown, the first turn 100 has a comparatively small diameter because the interior rolls of the cushion 28 are small.

Then, when the cushion 28 is rolled again to form a second compaction cycle, a second turn 102 is formed in the first interior seam 59; the second turn 102 has a larger diameter than the first turn 100 because the second roll is larger than the first. A third compaction cycle results in the formation of a third turn 104 that is larger in diameter than the second turn 102. A first turn 106 of the second interior seam 60 is also depicted. The second turn 102 is contiguous to the first turn 100 and to the third turn 104.

Each of the turns 100, 102, 104 is displaced from its predecessor by a distance proportional to its diameter. Since each of the interior seams 59, 60, 61 is straight, the displacement of each interior seam 59, 60, 61 in the longitudinal direction 13 is proportional to the length of the interior seam 59, 60, 61 (a subset of the total length 78) over which that displacement is to be measured. Larger turns 100, 102, 104 include a greater length of the interior seams 59, 60, 61, and therefore provide a greater displacement of the interior seams 59, 60, 61 in the longitudinal direction 13.

As shown in FIG. 4, the first and second turns 100, 102 are separated from each other in the longitudinal direction 13 by a smaller displacement 112 and a larger displacement 114. Similarly, the second and third turns 102, 104 are separated from each other in the longitudinal direction 13 by a smaller displacement 116 and a larger displacement 118, which are much larger than the displacements 112, 114 between the first and second turns 100, 102.

In the depicted embodiment, there is no overlap. As stated previously, overlap includes only interference between interior seams 59, 60, 61 in adjacent layers of the cushion 28 in the compacted state. Thus, the two halves of any of the turns 100, 102, 104 cannot overlap with each other because they are disposed on opposite sides of the bottom edge 52; they are therefore not in adjacent layers of the cushion 28. However, a portion of one of the turns 100, 102, 104 could overlap a portion of a different turn 100, 102, 104 with which it is aligned.

For example, if the first and second turns 100, 102 were closer together so that the smaller displacement 112 were negative, there would be overlap because portions of the first and second turns 100, 102 that are in adjacent layers would interfere with each other to create a larger bulge. As mentioned previously, the actual width 80 and the effective width 82 of each of the interior seams 59, 60, 61 includes the portions of the membranes 46, 48 that deform around the strips 69, 70, 71 as well as the width of the strips 69, 70, 71 themselves. The displacements 112, 114, 116, 118 are measured with respect to the full effective width 82 of the interior seams 59, 60, 61, rather than with respect to the edges of the strips 69, 70, 71.

There is no overlap in the configuration shown in FIG. 4 because the angle 94 is large enough to avoid overlap along the full length of the interior seams 59, 60, 61 in a rolled configuration. If the angle 94 were only one-half the inverse sine of the quantity consisting of the number of compaction cycles multiplied by two and by the actual thickness of the interior seam and divided by the length of the interior seam, overlap would be present along approximately half the length of each of the interior seams 59, 60, 61. For example, with such an angle, the smaller and greater displacements 112, 114 may both me negative, such that the first and second turns 100, 102 overlap, while the first and second displacements 112, 114 remain positive, so that the second and third turns 102, 104 do not overlap.

A minimum offset 120 is the offset between the commencement of the first turn 100, i.e., the end of the first interior seam 59 closest to the bottom seam 52, and the commencement of the second turn 102. The angle 94 that eliminates overlap along the whole length of each of the interior seams 59, 60, 61 is the angle 94 at which the minimum offset 120 is approximately equal to the effective width 82 of the first interior seam 59.

The first and second interior seams 59, 60 are separated by an offset 84. As shown in FIG. 4, the offset 84 is positive, so that no portion of the second interior seam 60 is at the same longitudinal location as any portion of the first interior seam 59. Thus, with a positive offset 84, overlap between the first and second interior seams 59, 60 is not possible. However, even if the offset 84 is negative, i.e., the first turn 106 of the second interior seam 61 commences before the end of the third turn 104 of the first interior seam 59, overlap may be avoided through careful selection of the offset 84.

For example, the offset 84 may be designed such that the first turn 106 of the second interior seam 60 is nested completely within the third turn 104, or between the second and third turns 102, 104, of the first interior seam 59. Overlap will not occur because the first turn 106 is within layers of the rolled cushion 28 that are not adjacent to any layer occupied by the third turn 104. Such a nested configuration will be depicted in greater detail in connection with FIG. 5.

As mentioned, there is no overlap in the configuration depicted in FIG. 4. However, some portions of the interior seams 59, 60, 61 are aligned to face each other at the same longitudinal position within the rolled cushion 28. For example, the two sections of the first turn 100 depicted in FIG. 4 face each other; they are not adjacent and therefore do not overlap. However, they are disposed at the same position along the longitudinal axis 13; thus, although they are not in direct interference with each other, their bulk is longitudinally concentrated, and may therefore still create bulges in the rolled cushion.

Figure 5:
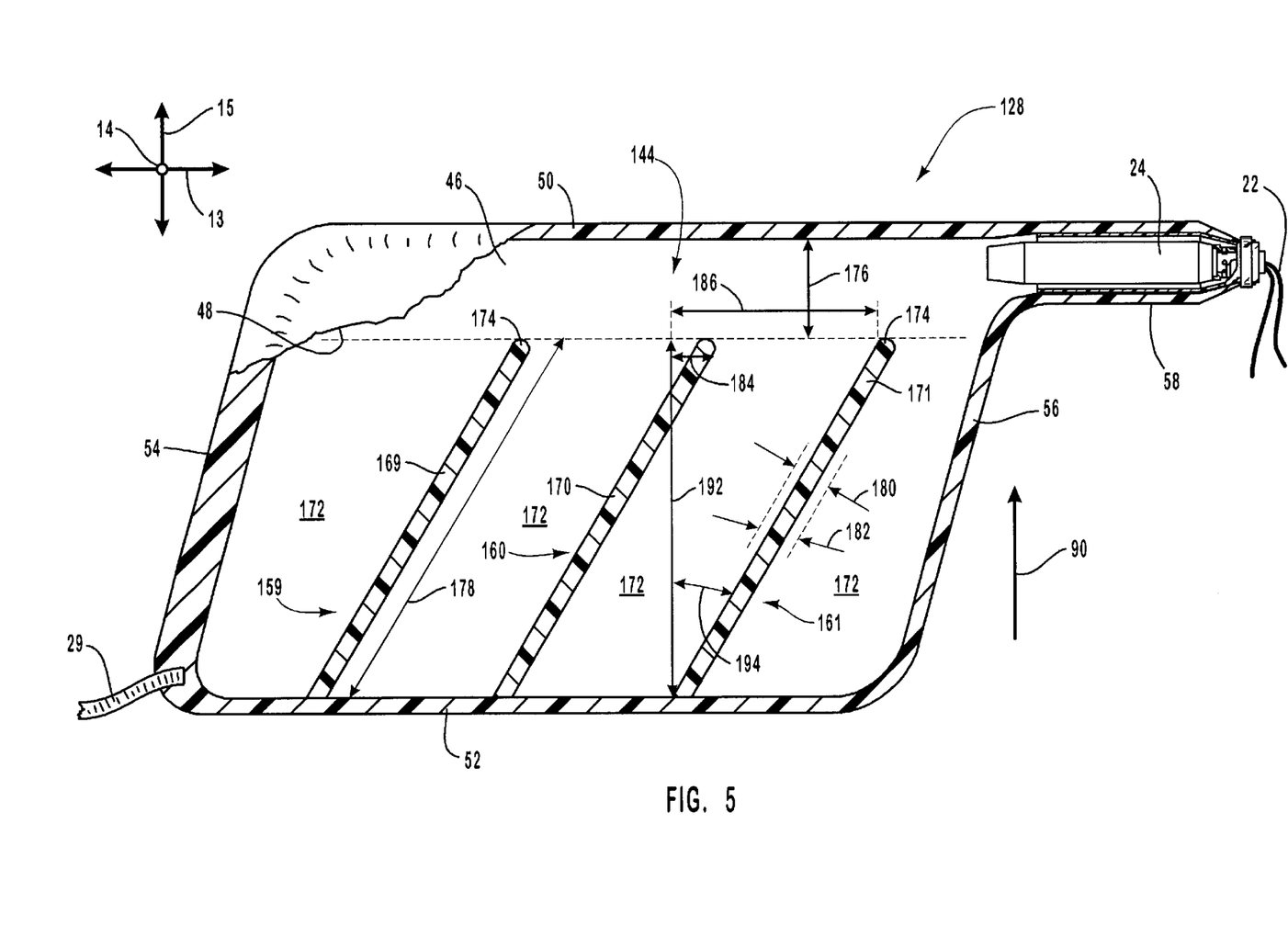
FIG. 5 is a side elevation, section view of an alternative embodiment of a cushion, with interior seams angled extremely enough to be nested when the cushion is rolled.

If desired, a still more extreme angle 94 may be used to ensure that no portion of any of the interior seams 59, 60, 61 faces another portion of the interior seams 59, 60, 61 at the same longitudinal position in the rolled cushion 28. Such an extreme angle 94 may require the use of a negative displacement 84 in order to accommodate all of the desired interior seams. Thus, the interior seams 59, 60, 61 may be nested as described above. Such nesting may be accomplished without having any portions of the first and second interior seams 59, 60 face each other at the same longitudinal position of the rolled cushion 28 if the third turn 104 is spaced over a long enough distance in the longitudinal direction 13. FIG. 5 depicts a nested configuration in greater detail.

Referring to FIG. 5, a section view of an alternative embodiment of a cushion 128 is depicted. The cushion 128 is similar to the cushion 28 of FIG. 2, in that the protection zone 144 of the cushion 128 has a first interior seam 159, a second interior seam 160, and a third interior seam 161. The interior seams 159, 160, 161 have a first strip 169, a second strip 170 and a third strip 171, respectively. The interiors seams 159, 160, 161 separate the cushion 128 into a plurality of chambers 172. Each strip has a distal end 174 toward the top edge 50 of the cushion 128; inflation gases flow into the chambers 172 through a gap 176 between the distal ends 174 and the top edge 50.

Each of the interior seams 159, 160, 161 has a length 178, an actual width 180, and an effective width 182 perpendicular to the compaction direction 90. Additionally each of the interior seams 159, 160, 161 has an offset 184 from its nearest neighbor(s) in the longitudinal direction 13. The offset 184 is negative because the bottom end of the second interior seam 160 is underneath the first interior seam 159, and the bottom end of the third interior seam 161 is underneath the second interior seam 160. Thus, when the cushion 128 is rolled, the interior seams 159, 160, 161 will be nested together.

Each of the interior seams 159, 160, 161 may also have a longitudinal displacement 186 and a transverse displacement 192. The interior seams 159, 160, 161 are each disposed at an angle 194 with respect to the compaction direction 90. As shown, the angle 194 is comparatively large, or extreme, so that the longitudinal displacement 186 of each of the interior seams 159, 160, 161 is quite large. The angle 194 may even be large enough so that no portion of any interior seam 159, 160, 161 faces any other portion of the same interior seam 159, 160, 161 at the same longitudinal position within the cushion 128, in the rolled configuration (not shown). Additionally, the offset 184 may be selected such that no portion of any interior seam 159, 160, 161 faces any portion of any other interior seam 159, 160, 161.

Such a configuration can be expected to have somewhat different operating characteristics than the cushion 28 of FIG. 2. For example, since the chambers 172 are angled extremely, the cushion 128 may produce somewhat less tension in the longitudinal direction 13, and somewhat more in the transverse direction 15.

Figure 6:
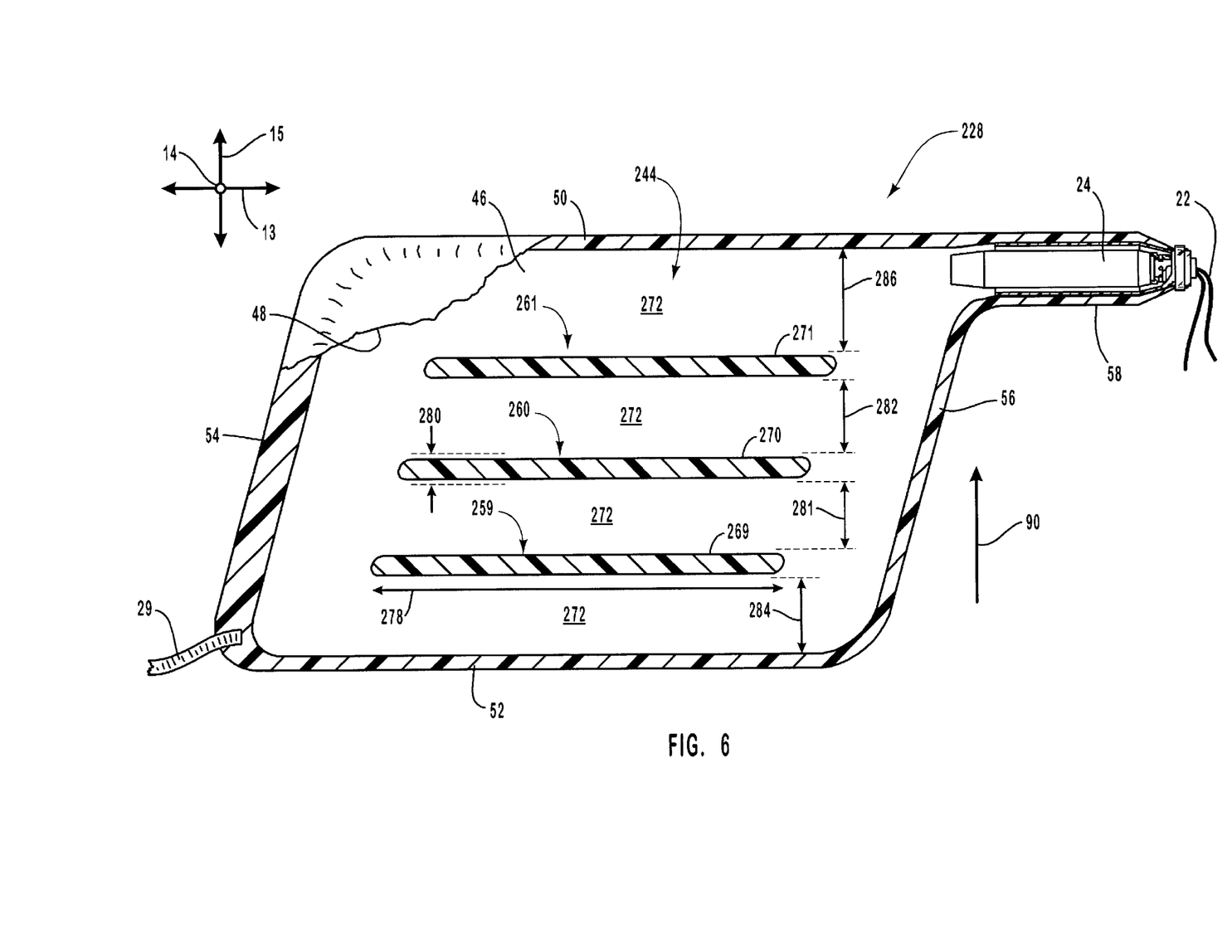
FIG. 6 is a side elevation, section view of another alternative embodiment of a cushion, with interior seams disposed perpendicular to the compaction direction such that no interior seam overlaps itself.

Referring to FIG. 6, another alternative embodiment of a cushion 228 is depicted. As with previous embodiments, the cushion 228 may have a protection zone 244 with a first interior seam 259, a second interior seam 260, and a third interior seam 261. The interior seams 259, 260, 261 may have a first strip 269, a second strip 270, and a third strip 271, respectively. The interior seams 259, 260, 261 separate the protection zone 244 into chambers 272. Each of the interior seams 259, 260, 261 may have a length 278 and an actual width 280.

Unlike previous embodiments, the interior seams 259, 260, 261 are all perpendicular to the compaction direction 90; thus, the chambers 272 are horizontal in the depicted embodiment. The interior seams 259, 260, 261 may thus be said to be at an angle of 90° with respect to the compaction direction 90. Consequently, the lateral inflation of the cushion 228 is limited as with previous embodiments, but the cushion 228 produces tension acting in the transverse direction 15. Such tension may be advantageous, depending on how the cushion 228 is tethered.

The second interior seam 260 may be separated from the first interior seam 259 by the first displacement, and from the third interior seam 260 by the second displacement. Additionally, the first interior seam 259 may be separated from the bottom edge 52 by the third displacement, and the third interior seam 261 may be separated from the top edge 50 by the fourth displacement. Preferably, the displacements 281, 282, 284, 286 are selected such that the interior seams 259, 260, 261 do not overlap when the cushion 228 is rolled.

Figure 7:
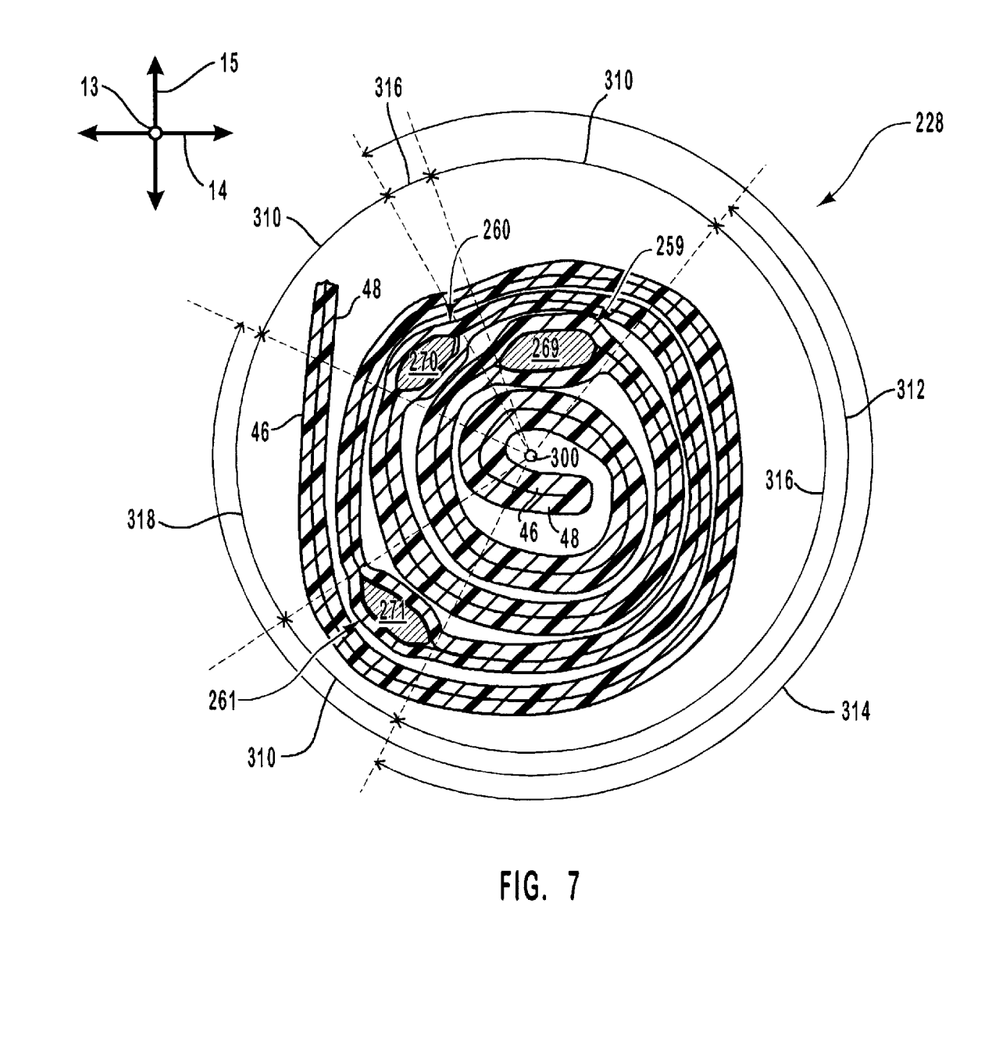
FIG. 7 is a front elevation, section view of the rolled cushion of FIG. 6, depicting the non-overlapping angular thicknesses of the interior seams.

Referring to FIG. 7, the cushion 228 of FIG. 6 is depicted in a rolled configuration. The rolled cushion 228 may have a central axis 300, or center 300. Since the interior seams 259, 260, 261 are perpendicular to the compaction direction 90, there is virtually no possibility that any interior seam 259, 260, 261 will overlap itself in any way. However, if the displacements 281, 282, 284, 286 are not selected properly, the interior seams 259, 260, 261 may overlap each other, thereby producing a bulge.

In the generally circular cross section shown, the displacements 282, 284 between the interior seams 259, 260, 261 and the actual width 280 of each interior seam 259, 260, 261 may be compared to an angular width 310 and angular displacements 312, 314, 316, 318. More specifically, the angular width 310 of each interior seam 259, 260, 261 may be the angle formed between lines projected from the center 300 and through each edge of each interior seam 259, 260, 261. Since the first interior seam 259 is disposed nearer the center 300, it will have a somewhat larger angular width 310. Similarly, the angular displacements 312, 314, 316, 318 are angles between the projection lines, from one interior seam 259, 260, 261 to the next.

The first angular displacement 312 is the angle separating the first and second interior seams 259, 260, and therefore corresponds to the first displacement 281. Similarly, the second angular displacement 314 is the angle separating the second and third interior seams 260, 261, corresponding to the second displacement 282. Preferably, the first and second angular displacements 312, 314 are selected such that there is no overlap between the angular widths 310 of the interior seams 259, 260, 261.

Thus, the first and second angular displacements 312, 314 can be neither too small, nor too large. The first angular displacement 312 may therefore be short enough to leave a third angular displacement 316 between the first and second interior seams 259, 260, opposite the first angular displacement 312. Similarly, the second angular displacement 314 may leave a fourth angular displacement 318 between the second and third interior seams 260, 261, opposite the second angular displacement 314.

As with previous embodiments, "overlap" relates to interference only in adjacent layers. However, the displacements 281, 282, 284, 286 may beneficially be selected such that none of the interior seams 259, 260, 261 are aligned at the same angular position with respect to the center 300, so that there is no angular overlap. Such is the case with FIG. 7, in which the interior seams 259, 260, 261 do not overlap, and furthermore, each interior seam 259, 260, 261 is in a separate angular section of the rolled cushion 228. As a result, the cushion 228 has a more compact profile.

Figure 8:
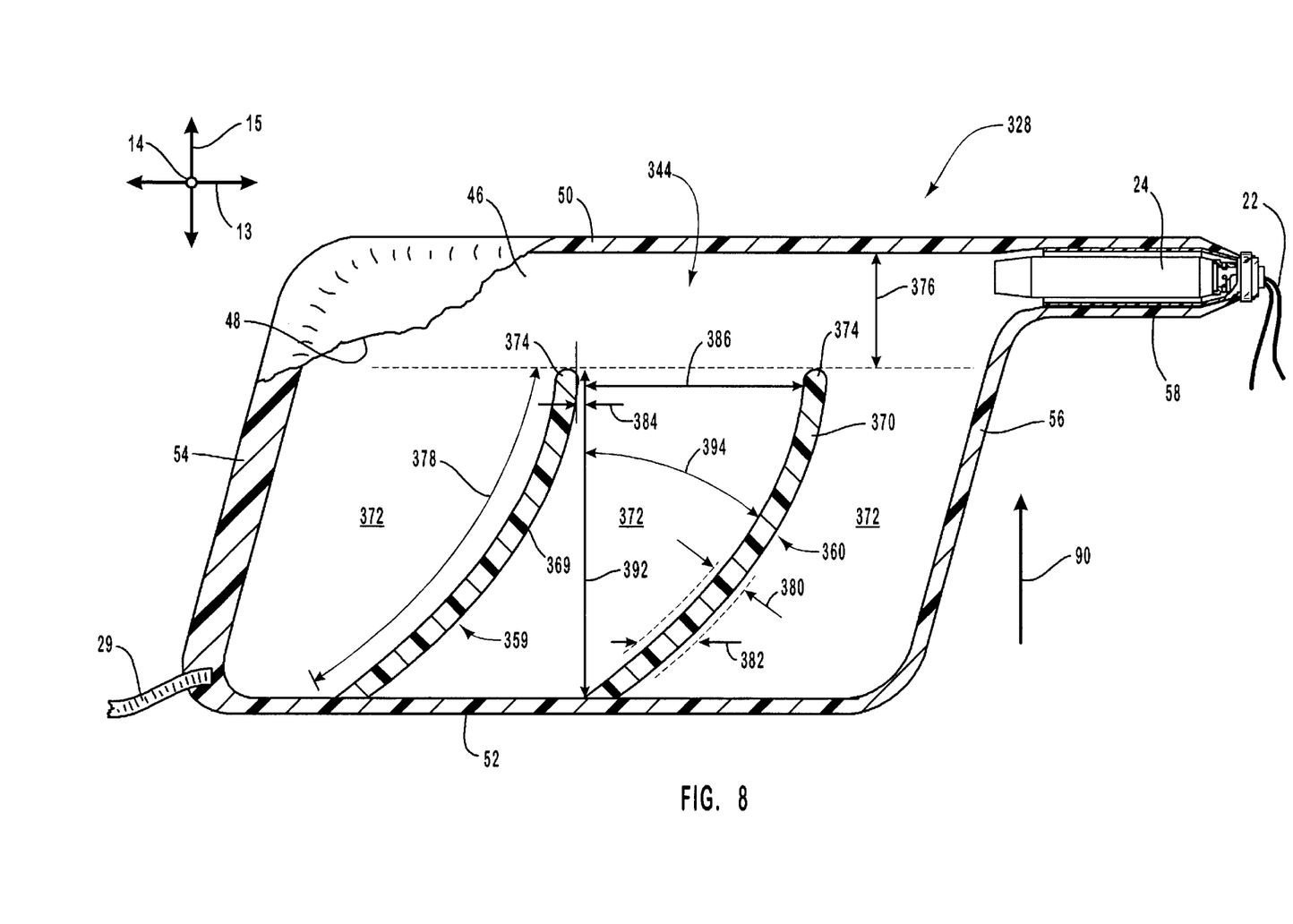
FIG. 8 is a side elevation, section view of yet another alternative embodiment of a cushion, with curved interior seams disposed such that the slope of the interior seams is greater toward the bottom edge, and decreases toward the top edge, such that the helical turns of the interior seams can be separated by a substantially equal displacement when the cushion is rolled.

Referring to FIG. 8, yet another embodiment of a cushion 328 is shown. The cushion 328 is also configured to be compacted, and more specifically, rolled, with a comparatively narrow profile. As with previous embodiments, the cushion 328 has a protection zone 344 between top and bottom edges 50, 52. A first interior seam 359 and a second interior seam 360 are formed in the protection zone 344. More or less interior seams may be used if desired, but only two are shown in FIG. 8 for clarity. The first and second interior seams 359, 360 have a first strip 369 and a second strip 370, respectively.

The first and second interior seams 359, 360 separate the protection zone 344 into chambers 372 configured to hold pressurized gas. Each of the interior seams 359, 360 has a distal end 374 toward the top edge 50; inflation gases may enter the chambers 372 through a gap 376 between the distal ends 374 and the top edge 50.

The first and second interior seams 359, 360 of this embodiment are at least partially curved. Preferably, the interior seams 359, 360 are curved such that the slope of the interior seams 359, 360 is smaller toward the bottom edge 52, and steadily increases as the interior seams 359, 360 extend toward the top edge 50. Each of the interior seams 359, 360 may have a length 378 extending along the curved path of the interior seam 359, 360.

The interior seams 359, 360 may each have an actual width 380 and an effective width 382, defined by the width of the interior seam 359, 360 perpendicular to the compaction direction 90. Since the effective width 382 is inversely proportional to the slope (assuming a constant actual width 380), the effective width 382 will be generally greater where the slope of the interior seams 359, 360 is smaller, i.e., toward the bottom edge 52.

The interior seams 359, 360 may be separated by an offset 386, defined as the distance between the interior seams 359, 360 in the longitudinal direction 13. Similarly, each of the interior seams 359, 360 may have a longitudinal displacement 386 consisting of the distance of travel of each of the interior seams 359, 360 in the longitudinal direction 13. A transverse displacement 392 similarly consists of the distance of travel of the interior seams 359, 360 in the transverse direction 15.

The interior seams 359, 360 have an angle 394 with respect to the compaction direction 90. Since the interior seams 359, 360 are curved, the angle 394 changes along the length of the interior seams 359, 360. More specifically, the angle 394 is greatest toward the bottom edge 52, and grows smaller toward the distal ends 374.

The result of such curvature is that the travel of the interior seams 359, 360 in the longitudinal direction 13 is greater toward the bottom edge 52. Thus, when the cushion 328 is rolled, the configuration of the helical turns in the interior seams 359, 360 is somewhat different from that shown in FIG. 4. Although the turns in the inner rolls of the rolled cushion 328 will still be smaller than those of the outer rolls, the turns are all spaced apart more equally. Thus, the turns will be separated by substantially the same displacement. As a result, the longitudinal displacement 386 of each of the interior seams 359, 360 need not be as large to avoid overlap of the inner turns formed by the portions of the interior seams 359, 360 closest to the bottom edge 52. Thus, if desired, more interior seams 359, 360 may possibly be utilized within the same sized cushion 328, without producing overlap.

Through the use of the systems and methods provided herein, inflatable curtains may be compacted into a slimmer profile, thereby permitting their installation in a wider variety of configurations and vehicles. The bulk of the interior seams within cushions may be distributed more evenly within the compacted cushion without compromising the operation of the seams to shape the inflated cushion and provide tension to hold the cushion in place.

Furthermore, the present invention may be used with a wide variety of interior seam configurations, including angled seams, horizontal seams, curved seams, nested seams, and the like. A variety of compaction methods may also be used, including rolling, folding with successive alternating folds, and folding with successive inward folds. Thus, the benefits of the present invention may be obtained with a minimum of design and manufacturing changes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A cushion for an inflatable curtain module for protecting occupants of a vehicle, the cushion comprising:
   a top edge configured to be fastened to the vehicle;
   a bottom edge configured to be drawn toward the top edge in a compaction direction by a compaction process selected from the group consisting of rolling and folding; and
   a protection zone between the top edge and the bottom edge, the protection zone being configured to contain a pressurized gas, the protection zone having an interior seam having a length;
   wherein the interior seam is disposed at an angle with respect to the compaction direction such that overlap of the interior seam with itself is substantially avoided along at least half the length when the compaction process has been carried out;
   wherein the angle is not substantially less than half the inverse sine of the quantity consisting of a number of compaction cycles in the compaction process multiplied by two and by a thickness of the interior seam and divided by the length of the interior seam, the compaction cycles including folds and rolls.

2. The cushion of claim 1, wherein the compaction process comprises rolling.

3. The cushion of claim 2, wherein the angle is between about 5 degrees and about 40 degrees.

4. The cushion of claim 2, wherein the angle is about 90 degrees.

5. The cushion of claim 1, wherein the compaction process comprises folding.

6. The cushion of claim 5, wherein the angle is between about 5 degrees and about 40 degrees.

7. The cushion of claim 5, wherein the angle is about 90 degrees.

8. The cushion of claim 1, wherein the angle is selected to completely avoid overlap of the interior seam with itself along the entire length of the interior seam when the compaction process has been carried out.

9. The cushion of claim 8, wherein the angle is selected to dispose the interior seam such that no two portions of the interior seam are disposed to face each other at any single longitudinal position along a length of the cushion when the compaction process has been carried out.

10. The cushion of claim 1, wherein the interior seam comprises a strip of fabric positioned between two membranes of the protection zone and radio frequency (RF) welded to the two membranes.

11. A method for manufacturing a cushion for an inflatable curtain module, the method comprising:
   providing a protection zone, a top edge attached to the protection zone, and a bottom edge attached to the protection zone opposite the top edge, the protection zone having a first membrane and a second membrane configured to contain a pressurized gas, wherein the bottom edge is configured to be moved toward the top edge along a compaction direction by a compaction process chosen from the group consisting of folding and rolling;
   determining how many compaction cycles will be applied to bring the cushion to a compacted configuration;
   selecting an angle for a first interior seam to be formed in the protection zone based on the number of compaction cycles such that the first interior seam is disposed in a helical configuration when the bottom edge is rolled toward the top edge, the first interior seam having a length, wherein the helical configuration has a plurality of contiguous turns separated by displacements sufficient to substantially avoid overlap of the contiguous turns with each other along at least half the length; and
   forming the first interior seam to attach the first membrane to the second membrane within the protection zone, the first interior seam being disposed at the angle with respect to the compaction direction.

12. The method of claim 11, further comprising forming a second interior seam disposed at the angle such that the second interior seam is disposed in the helical configuration when the bottom edge is rolled toward the top edge, the helical configuration of the second interior seam having a plurality of contiguous turns.

13. The method of claim 12, further comprising selecting a displacement between the first and second seams to longitudinally displaced the second seam from the first interior seam by an offset sufficient to prevent any portion of the first interior seam from facing any portion of the second interior seam at a single longitudinal position along a length of the cushion when the bottom edge is rolled toward the top edge.

14. The method of claim 12, wherein forming the first and second interior seams comprises nesting the first and second seams such that a portion of the first interior seam faces a portion of the second interior seam at a single longitudinal position along a length of the cushion, but no turn of the helical configuration of the first interior seam overlaps any turn of the helical configuration of the second interior seam when the bottom edge is rolled toward the top edge.

15. The method of claim 12, further comprising forming a third interior seam disposed at the angle such that the third interior seam is disposed in the helical configuration when the bottom edge is rolled toward the top edge, the helical configuration of the third interior seam having a plurality of contiguous turns.

16. The method of claim 11, wherein the selecting the angle comprises completely avoiding overlap of any contiguous turn of the helical configuration along the entire length of the first interior seam when the bottom edge is rolled toward the top edge.

17. The method of claims 11, wherein selecting the angle comprises varying the angle along the length of the first interior seam such that the first interior seam has a curved configuration, the angle being comparatively greater toward the bottom edge and comparatively smaller toward the top edge.

18. A The method of claim 17, selecting the angle comprises varying the angle such that the displacements separating the contiguous turns of the helical configuration are all equal when the bottom edge is rolled toward the top edge.

19. A method for manufacturing a cushion for an inflatable curtain module, the method comprising:

providing a protection zone, a top edge attached to the protection zone, and a bottom edge attached to the protection zone opposite the top edge, the protection zone having a first membrane and a second membrane configured to contain a pressurized gas, wherein the bottom edge is configured to be drawn moved toward the top edge along a compaction direction by a compaction process chosen from the group consisting of folding and rolling;

determining how many compaction cycles will be applied to bring the cushion to a compacted configuration;

selecting displacements for a plurality of interior seams to be formed in the protection zone based on the number of compaction cycles such that overlap of the interior seams with each other is substantially avoided when the bottom edge is rolled toward the top edge; and forming the interior seams in a disposition substantially perpendicular to the compaction direction to attach the first membrane to the second membrane within the protection zone, the interior seams being separated from each other by at least one of the displacements.

20. The method of claim 19, wherein the plurality of interior seams comprises a first interior seam, a second interior seam, and a third interior seam, wherein forming the interior seams comprises separating the second interior seam from the first interior seam by a first displacement, separating the second interior seam from the third interior seam by a second displacement, separating the first interior seam from the bottom edge by a third displacement, and separating the third interior seam from the top edge by a fourth displacement.

21. The method of claim 20, wherein selecting the displacements comprises selecting a second displacement that is not equal to the first displacement.

22. The method of claim 19, wherein selecting the displacements comprises selecting the displacements such that corresponding angular displacements are formed between the interior seams when the bottom edge is rolled toward the top edge, the angular displacements disposing the interior seams about different angular positions with respect to a center of the rolled cushion to avoiding angular overlap between angular thicknesses of the interior seams.

23. A method for manufacturing a cushion for an inflatable curtain module, the method comprising:

providing a protection zone, a top edge attached to the protection zone, and a bottom edge attached to the protection zone opposite the top edge, the protection zone having a first membrane and a second membrane configured to contain a pressurized gas, wherein the bottom edge is configured to be moved toward the top edge along a compaction direction by a compaction process chosen from the group consisting of folding and rolling;

determining how many compaction cycles will be applied to bring the cushion to a compacted configuration;

selecting an angle for an interior seam to be formed in the protection zone based on the number of compaction cycles such that overlap of the interior seam with itself is substantially avoided along at least half a length of the interior seam when the cushion is in the compacted configuration; and forming the interior seam to attach the first membrane to the second membrane within the protection zone, the interior seam being disposed at the angle with respect to the compaction direction.

24. The cushion of claim 23, wherein the compaction process comprises rolling.

25. The cushion of claim 24, wherein selecting the angle comprises choosing an angle between about 5 degrees and about 40 degrees.

26. The cushion of claim 24, wherein selecting the angle comprises choosing an angle of about 90 degrees.

27. The cushion of claim 23, wherein the compaction process comprises folding.

28. The cushion of claim 27, wherein selecting the angle comprises choosing an angle between about 5 degrees and about 40 degrees.

29. The cushion of claim 27, wherein selecting the angle comprises choosing an angle of about 90 degrees.

30. The cushion of claim 23, wherein selecting the angle comprises choosing the angle such that overlap of the interior scam with itself is completely avoided along the entire length of the interior seam when the compaction process has been carried out.

31. The cushion of claim 30, wherein selecting the angle comprises choosing the angle such that no two portions of the interior seam are disposed to face each other at any single longitudinal position along a length of the cushion when the compaction process has been carried out.

32. The cushion of claim 23, wherein selecting the angle comprises choosing an angle that is not substantially less than half the inverse sine of the quantity consisting of a number of compaction cycles in the compaction process multiplied by two and by a thickness of the interior seam and divided by the length of the interior seam, the compaction cycles including folds and rolls.

33. The cushion of claim 23, wherein forming the interior seam comprises positioning a strip of fabric between the two membranes and radio frequency (RF) welding the strip of fabric to the two membranes.

* * * * *